United States Patent
Rubino

[11] Patent Number: 5,230,303
[45] Date of Patent: Jul. 27, 1993

[54] PET HAIR REMOVAL APPARATUS

[76] Inventor: Robert M. Rubino, 751 Sandra Ave., West Islip, N.Y. 11795

[21] Appl. No.: 897,417

[22] Filed: Jun. 12, 1992

[51] Int. Cl.$^5$ .............................................. A01K 13/00
[52] U.S. Cl. ...................................... 119/83; 119/159; 401/190
[58] Field of Search ................... 119/85, 83, 156, 159; 606/133, 134; 15/104.001, 104.002, 104.94; 401/190

[56] References Cited

U.S. PATENT DOCUMENTS

| | | | |
|---|---|---|---|
| 3,177,512 | 4/1965 | Balaban | 15/104.002 |
| 3,742,547 | 7/1973 | Sohmer | 15/104.002 |
| 3,748,678 | 7/1973 | Ballou | 401/219 X |
| 4,059,358 | 11/1977 | Arai | 401/219 |
| 4,727,616 | 3/1988 | Kucera et al. | 15/104.002 |

*Primary Examiner*—Robert P. Swiatek
*Attorney, Agent, or Firm*—Leon Gilden

[57] ABSTRACT

A pet hair removal apparatus includes a support handle having an angulated support frame rotatably mounting an adhesive tube thereon removably mounted for replacement thereof. A modification of the invention includes the handle formed with an applicator spray structure to direct a fluid spray, to include flea spray, perfume, and the like onto an associated animal being groomed.

3 Claims, 4 Drawing Sheets

PRIOR ART

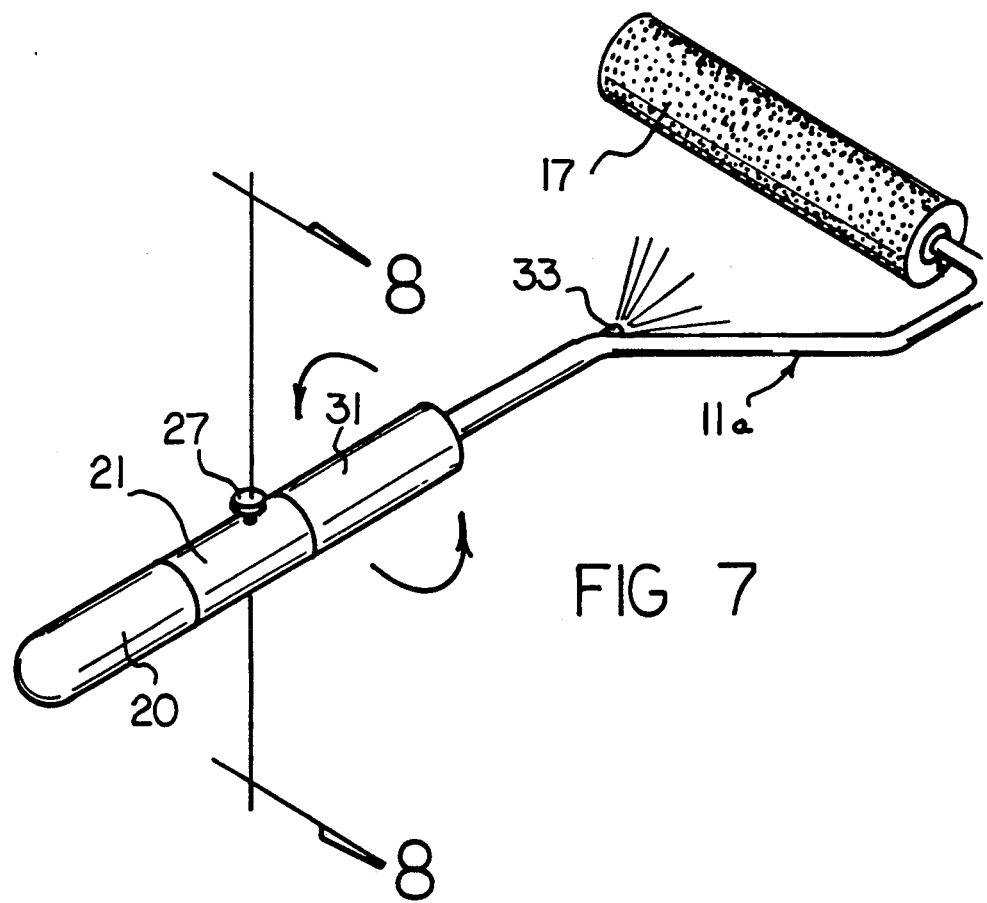
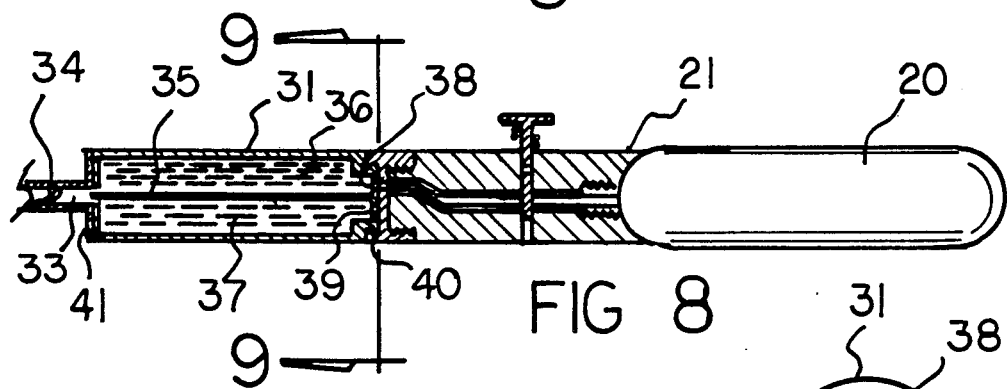
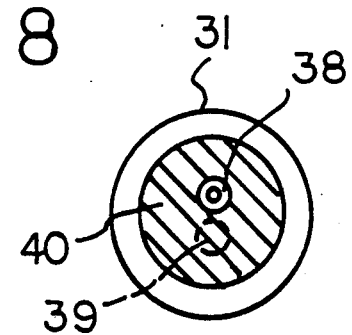

PET HAIR REMOVAL APPARATUS

BACKGROUND OF THE INVENTION

1. Field of the Invention

The field of invention relates to lint removal structure, and more particularly pertains to a new and improved pet hair removal apparatus wherein the same is arranged for the removal of excess hair relative to an animal, such as a dog, cat, and the like, for grooming of such animals.

2. Description of the Prior Art

Grooming rollers of various types, particularly for use with garments, is available in the prior art, as indicated by the U.S. Pat. Nos. 3,421,170; 4,422,201; U.S. Pat. No. Des. 276,763; and U.S. Pat. No. 4,905,337.

The prior art has heretofore, however, availed itself to the utilization of such structure relative to garments and is typically of an organization and configuration not efficient in the grooming of an animal.

In the regard, the present invention attempts to overcome deficiencies of the prior art by providing for a pet hair removal apparatus setting forth the problems of ease of use as well as effectiveness in construction in the removal of excess hair relative to an animal and in this respect, the present invention substantially fulfills this need.

SUMMARY OF THE INVENTION

In view of the foregoing disadvantages inherent in the known types of lint removal structure now present in the prior art, the present invention provides a pet hair removal apparatus having a rotatable roller, including an adhesive surface to remove excess hair relative to an animal being groomed. As such, the general purpose of the present invention, which will be described subsequently in greater detail, is to provide a new and improved pet hair removal apparatus which has all the advantages of the prior art pet hair grooming apparatus and none of the disadvantages.

To attain this, the present invention provides a pet hair removal apparatus including a support handle having an angulated support frame rotatably mounting an adhesive tube thereon removably mounted for replacement thereof. A modification of the invention includes the handle formed with an applicator spray structure to direct a fluid spray, to include flea spray, perfume, and the like onto an associated animal being groomed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet hair removal apparatus which has all the advantages of the prior art pet hair grooming apparatus and none of the disadvantages.

It is another object of the present invention to provide a new and improved pet hair removal apparatus which may be easily and efficiently manufactured and marketed.

It is a further object of the present invention to provide a new and improved pet hair removal apparatus which is of a durable and reliable construction.

An even further object of the present invention is to provide a new and improved pet hair removal apparatus which is susceptible of a low cost of manufacture with regard to both materials and labor, and which accordingly is then susceptible of low prices of sale to the consuming public, thereby making such pet hair removal apparatus economically available to the buying public.

Still yet another object of the present invention is to provide a new and improved pet hair removal apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of a further modified aspect of the invention.

FIG. 8 is an orthographic view, taken along the lines 8—8 of FIG. 7 in the direction indicated by the arrows.

FIG. 9 is an orthographic view, taken along the lines 9—9 of FIG. 8 in the direction indicated by the arrows.

DESCRIPTION OF THE PREFERRED EMBODIMENT

Figure 1:
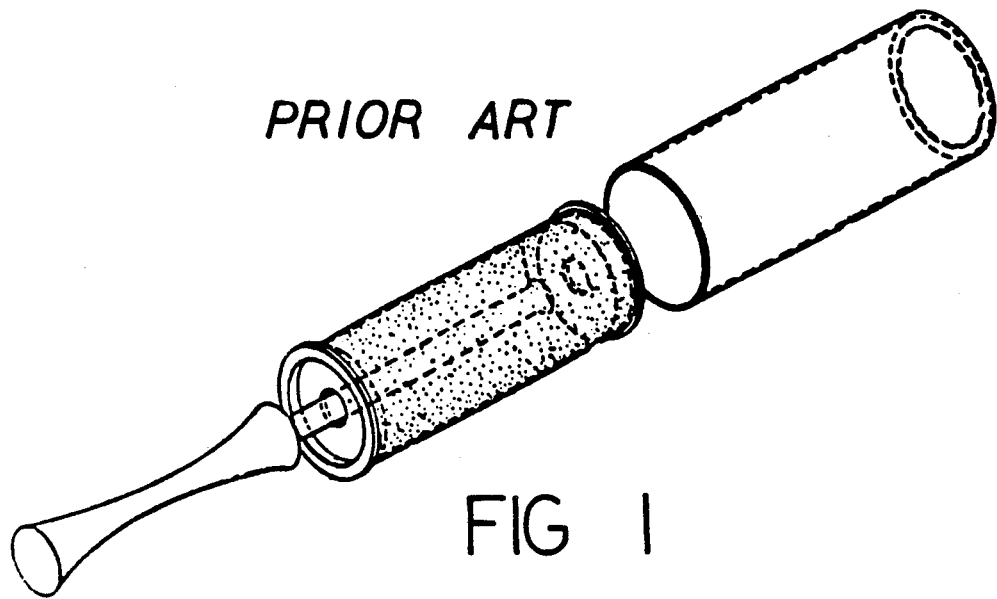
FIG. 1 is an isometric illustration of a prior art lint removal structure.
Figure 2:
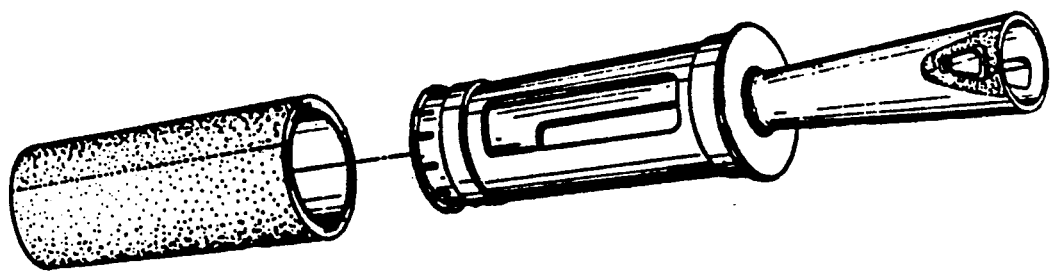
FIG. 2 is an isometric illustration of a further prior art lint removal structure.
Figure 3:
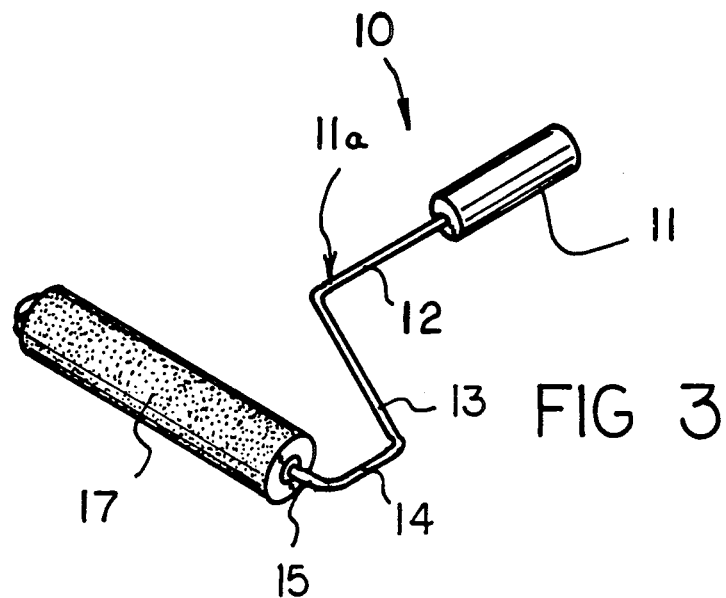
FIG. 3 is an isometric illustration of the invention.
Figure 4:
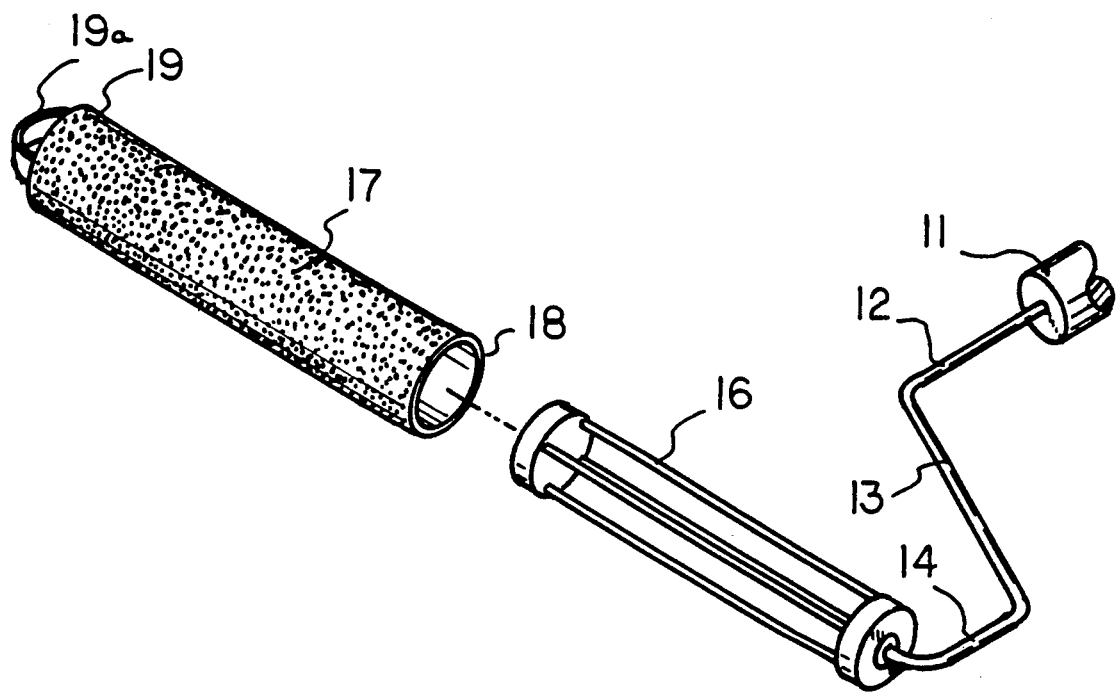
FIG. 4 is an isometric view of the invention in its full configuration.

With reference now to the drawings, and in particular to FIGS. 1 to 9 thereof, a new and improved pet hair removal apparatus embodying the principles and concepts of the present invention and generally designated by the reference numeral 10 will be described.

The FIG. 1 illustrates a prior art lint removal structure, as indicated in U.S. Pat. No. 3,421,170, having a removable adhesive roll mounted thereon. The FIG. 2 indicates a prior art configuration as set forth in the U.S. Pat. No. Des. 276,763, in what appears to be a removable cylinder relative to a rotatable mandrel.

More specifically, the pet hair removal apparatus 10 of the instant invention essentially comprises a support handle 11 having a support frame 11a mounted thereto extending coaxially and forwardly of the support handle 11. The support frame 11a includes a first support rod segment 12 coaxially aligned relative to the support handle 11, with a second support rod segment 13 fixedly mounted to the first support rod segment at an obtuse included angle. A third support rod segment 14 is mounted at an obtuse included angle relative to the second support rod segment 13, and finally, a fourth support rod segment 15 orthogonally oriented relative to the third support rod segment 14 rotatably mounts a roller cage 16, with the roller cage 16 defined by a predetermined length and oriented forwardly and medially of the support handle 11 and the first support rod segment 12. An adhesive tube 17 is provided of a length equal to said predetermined length frictionally and complementarily received over the roller cage 16. The tube 17 is formed with a first end 18 and a second end 19, with the second end 19 having a loop 19a mounted to diametrically opposed sides of the second end 19 for ease of manual grasping of the adhesive tube 17 for removal and insertion relative to the roller cage 16.

Figure 5:
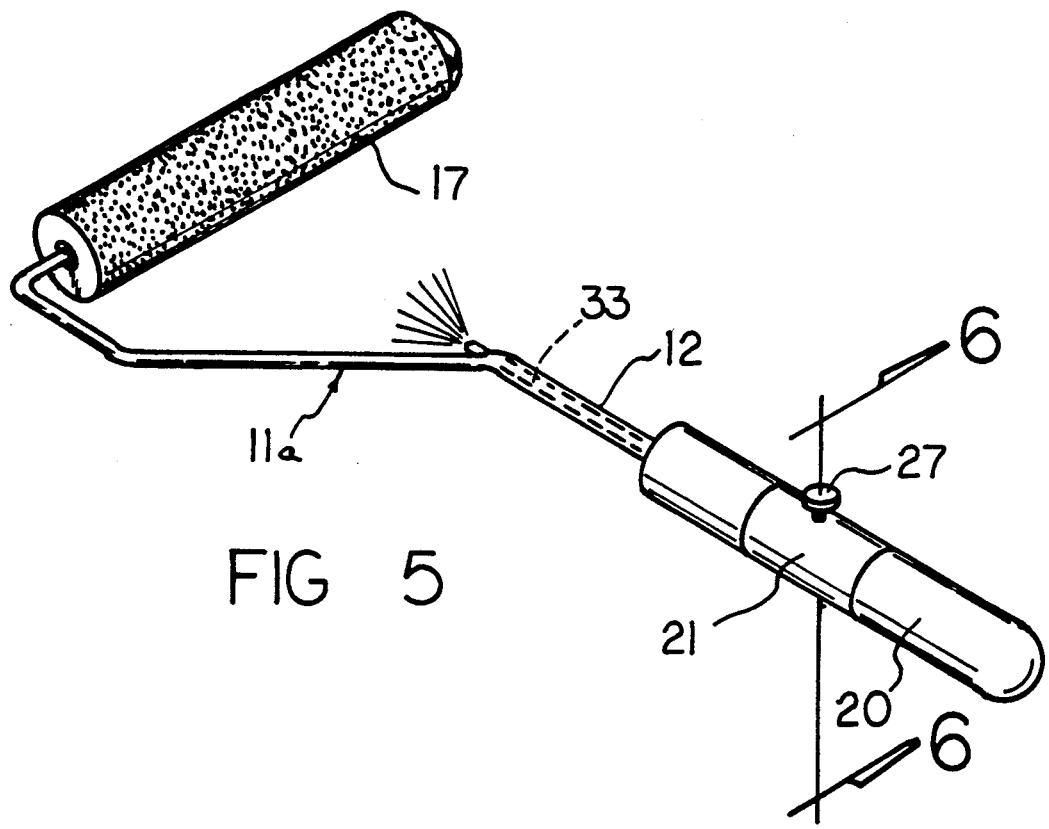
FIG. 5 is an isometric illustration of a modified aspect of the invention.
Figure 6:
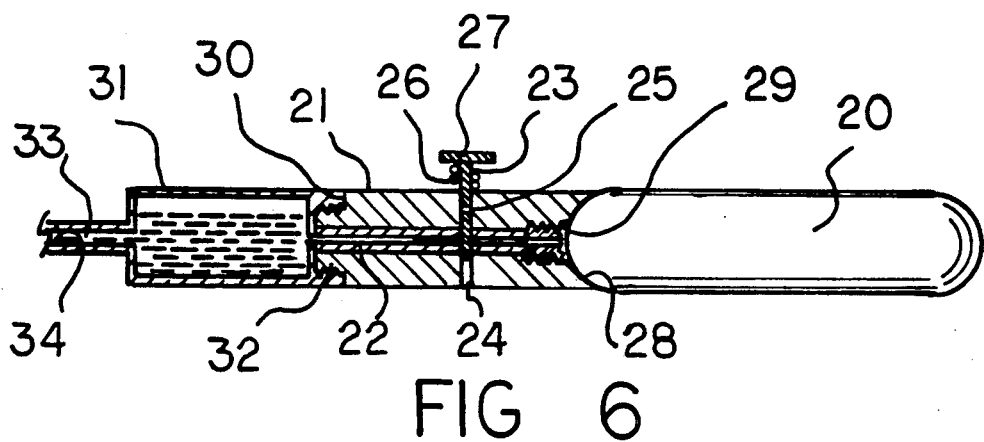
FIG. 6 is an orthographic view, taken along the lines 6—6 of FIG. 5 in the direction indicated by the arrows.

The FIGS. 5 and 6 illustrate the use of a modified aspect of the invention having the handle formed with a compressed gas canister 20 mounted to a central handle 21, and more specifically to a central handle first end 28 within a first end internally threaded bore 29 to coaxially align the canister 20 relative to the central handle 21. The central handle 21 is formed with a through-extending handle conduit 22 having a slide valve rod 23 orthogonally directed through the handle conduit 22. The valve rod 23 is slidably received within a valve rod bore 24 within the central handle 21, with the valve rod 23 including an aperture 25 displaced from the conduit 22 in a first position and selectively aligned with the conduit in a second position to permit the compressed gas from the canister 20 to be directed through the conduit 22. The valve rod 23 is maintained in the first position by a spring 26 captured between the central handle 21 and a rod head 27 mounted to an upper distal end of the valve rod 23.

The central handle is formed with a second end 30 rotatably receiving a fluid reservoir 31 thereon. The fluid reservoir 31 includes threaded securement to a threaded boss 32 on the second end 30 of the central handle. An outlet conduit 33 is coaxially aligned relative to the reservoir 31 and the central handle 21 and the gas canister 20. A flap valve 34 within the outlet conduit 33 maintains fluid within the reservoir when not pressurized with the valve rod in the first position, as illustrated. Fluid contained within the reservoir may be flea spray, perfume, and the like for utilization in a pet grooming procedure. The fluid may thereby be imparted onto the roll for projecting onto the animal during a grooming procedure.

The FIGS. 7-9 indicate a modified reservoir structure having a first reservoir chamber 36 and a second reservoir chamber 37 divided by a central flexible membrane 35, with the reservoir having a reservoir rear wall 40 including a first chamber port 38 and a second chamber port 39 selectively aligned with the handle conduit 22 upon rotation of the reservoir relative to the central handle second end. In this manner upon compressing of the first reservoir chamber as illustrated, the membrane is deflected to direct the fluid within the first reservoir chamber through the outlet conduit 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet hair removal apparatus, comprising,
    a support handle, the support handle having a support frame fixedly mounted to the support handle, with the support frame including a first rod segment fixedly and coaxially aligned relative to the support handle projecting therefrom, with the first support rod segment including a second support rod segment fixedly mounted to the first support rod segment defining an obtuse included angle therebetween, and
    a third support rod segment fixedly mounted to the second support rod segment defining a further obtuse included angle therebetween, and
    a fourth support rod segment orthogonally mounted to the third support rod segment, the fourth support rod segment including a roller cage, with the roller cage rotatably mounted relative to the fourth support rod segment and the roller cage orthogonally and medially oriented relative to the support handle and the first support rod segment, and
    an adhesive tube removably mounted relative to the roller cage, and
    the adhesive tube includes a first end and a second end, the second end including a mounting loop, the mounting loop diametrically secured to opposed sides of the second end, and the support handle includes a central handle, the central handle including a first end and a second end, the first end including an internally threaded bore, and a compressed gas canister, the compressed gas canister longitudinally aligned relative to the central handle and threadedly received within the internally threaded bore, and the central handle including a central handle conduit directed through the central handle, and the central handle further including a valve rod bore orthogonally directed through the central handle intersecting the central handle conduit, and a valve rod slidably mounted within the valve rod bore, the valve rod including a valve rod aperture selectively aligned with the central handle conduit, with the valve rod aperture biased to a first position displaced relative to the central handle conduit and manually displaced to a second position, wherein the valve rod bore is aligned with the central handle conduit.

2. An apparatus as set forth in claim 1 wherein the valve rod includes a valve rod head mounted to an upper distal end of the valve rod exteriorly of the central handle, and a spring captured between the central handle and the valve rod head to bias the valve rod to the first position, the central handle second end including a threaded boss, with a fluid reservoir mounted to the threaded boss, the fluid reservoir including a fluid reservoir rear wall and the rear wall including at least one port directed through the rear wall for alignment with the central handle conduit, and the fluid reservoir having an outlet conduit directed through the first support rod segment projecting therefrom in confrontation to the adhesive tube.

3. An apparatus as set forth in claim 2 wherein the fluid reservoir includes a first reservoir chamber and a second reservoir chamber having a central flexible membrane at an interface between the first reservoir chamber and the second reservoir chamber, and a flap valve mounted within the outlet conduit to maintain fluid within the fluid reservoir when the valve rod is in the first position, and the fluid reservoir rear wall having a further port, wherein the further port is directed into the second reservoir chamber, and the at least one port is directed into the first reservoir chamber and the fluid reservoir is rotatably mounted relative to the central handle to selectively align the at least one port and the further port relative to the central handle conduit.

* * * * *